United States Patent
Tillotson

(10) Patent No.: US 7,342,913 B2
(45) Date of Patent: Mar. 11, 2008

(54) METHOD FOR ASSIGNING SLOTS IN A MOBILE NETWORK

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 500 days.

(21) Appl. No.: 10/996,735

(22) Filed: Nov. 23, 2004

(65) Prior Publication Data

US 2006/0109831 A1   May 25, 2006

(51) Int. Cl.
H04Q 7/14   (2006.01)

(52) U.S. Cl. ............. 370/348; 370/436; 370/329

(58) Field of Classification Search ............ None
See application file for complete search history.

(56) References Cited

U.S. PATENT DOCUMENTS

| 6,708,239 B1 | 3/2004 | Ellerbrock et al. |
| 6,791,994 B1* | 9/2004 | Young et al. ............ 370/436 |
| 7,106,707 B1* | 9/2006 | Strutt ............ 370/329 |
| 2003/0035394 A1* | 2/2003 | Zeira et al. ............ 370/335 |
| 2003/0101034 A1 | 5/2003 | Tillotson |
| 2003/0117981 A1 | 6/2003 | Tillotson |
| 2003/0169721 A1 | 9/2003 | Tillotson |
| 2004/0203716 A1 | 10/2004 | Tillotson |

* cited by examiner

Primary Examiner—Erika A. Gary
(74) Attorney, Agent, or Firm—Wildman, Harrold, Allen & Dixon

(57) ABSTRACT

A method of acquiring transmit and receive slots in a peer-to-peer network comprising acquiring data about a plurality of nodes in the network, the data including a code corresponding to send slots and receive slots for the plurality of nodes; finding an available code based upon the data about the plurality of nodes in the network; and setting send slots and receive slots based upon the available code. A method for setting a code for a node in a peer-to-peer network, the nodes indicative of send and receive time slots for the node, comprising determining a code length; assigning the node a first string of bits half the code length to create a first half of the code; and assigning the node a second string of bits that is the inverse of the first string of bits to create the second half of the code. In one embodiment, the methods described herein allow for a TDMA network utilizing a single frequency band.

66 Claims, 2 Drawing Sheets

METHOD FOR ASSIGNING SLOTS IN A MOBILE NETWORK

BACKGROUND OF THE INVENTION

1. Field of the Invention

The present invention relates to mobile networks. More specifically, the present invention relates to assigning communication slots in a mobile network.

2. Discussion of the Related Art

Generally Time Division Multiple Access (TDMA) systems have multiple frequency bands that information is sent and received on. For example, a cellular telephone will receive data in one frequency band and send data in another frequency band. This allows the cellular telephone to send and receive data at the same time. If the cellular telephone were to attempt transmit and receive data on the same frequency band at the same time, the signals will interfere with each other and the data will be lost.

SUMMARY OF THE INVENTION

In one embodiment, the invention can be characterized as a method of acquiring transmit and receive slots in a peer-to-peer network comprising acquiring data about a plurality of nodes in the network, the data including a code corresponding to send slots and receive slots for the plurality of nodes; finding an available code based upon the data about the plurality of nodes in the network; and setting send slots and receive slots based upon the available code.

In another embodiment, the invention can be characterized as a method for setting a code for a node in a peer-to-peer network, the code indicative of send and receive time slots for the node, comprising determining a code length m; assigning the node a first string of bits half the code length to create a first half of the code; and assigning the node a second string of bits that is the inverse of the first string of bits to create the second half of the code.

In a subsequent embodiment, the invention can be characterized as a node in a peer-to-peer communication network comprising an antenna for sending and receiving data; and a controller configured to acquire information about neighboring nodes within the peer-to-peer network and configured to set a code corresponding to send and receive slots based upon the information acquired about the neighboring nodes.

BRIEF DESCRIPTION OF THE DRAWINGS

The above and other aspects, features and advantages of the present invention will be more apparent from the following more particular description thereof, presented in conjunction with the following drawings, wherein.

Figure 1:
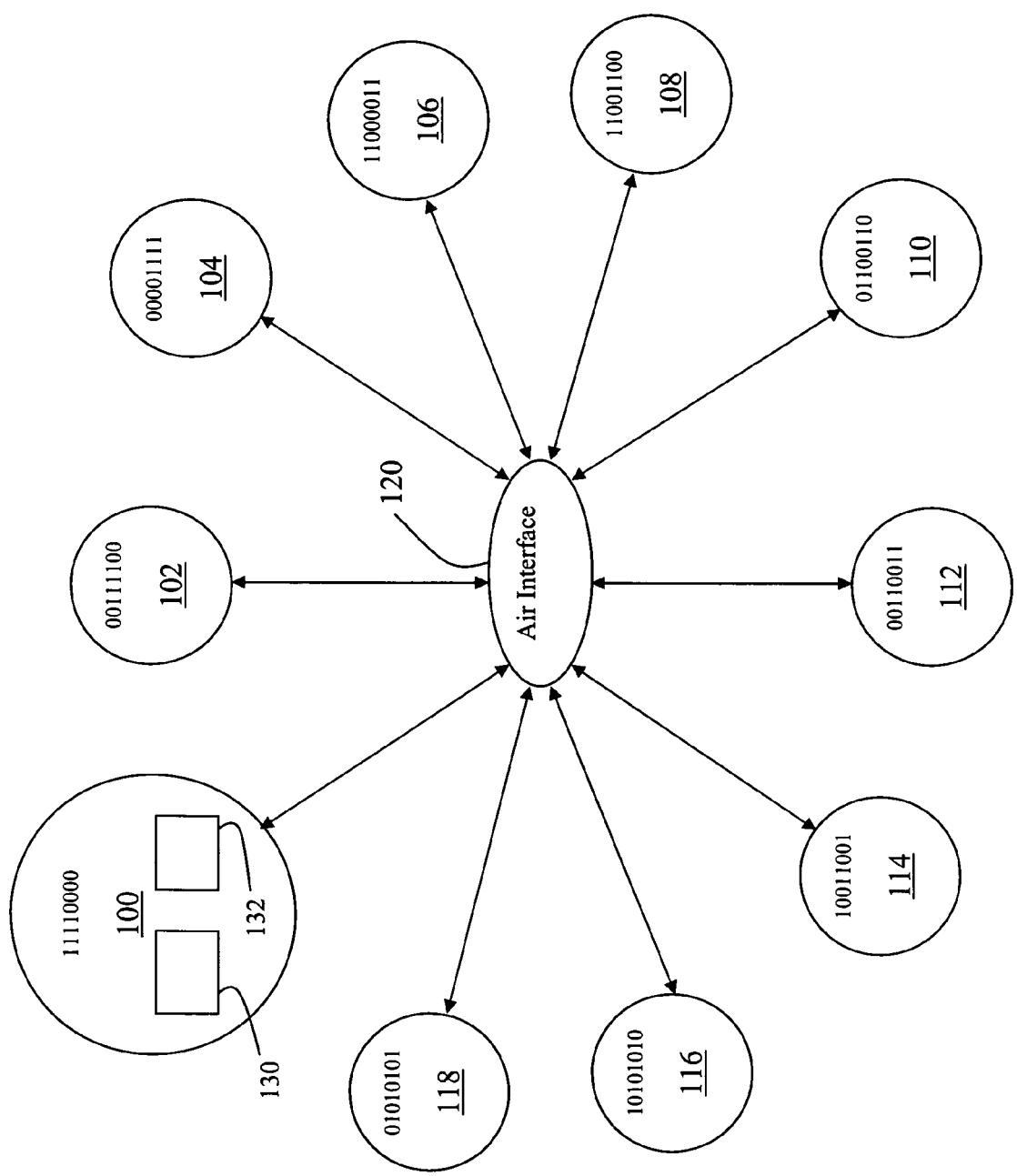
FIG. 1 is a block diagram illustrating communication between nodes within a TDMA network.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the invention. The scope of the invention should be determined with reference to the claims. The present embodiments address the problems described in the background while also addressing other additional problems as will be seen from the following detailed description.

Referring to FIG. 1 is a block diagram illustrating communication between a plurality of nodes within a TDMA network. Shown is a first node 100, a second node 102, a third node 104, a fourth node 106, a fifth node 108, a sixth node 110, a seventh node 112, an eighth node 114, a ninth node 116, a tenth node 118 and an air interface 120, a antenna 130 and a controller 132.

All of the nodes shown in FIG. 1 are neighboring nodes and thus, can directly communicate with each other through the air interface. For example, the first node 100 can communicate directly with nine nodes and the second node 102 can also communicate with nine nodes. The first node 100 includes the antenna 130 and the controller 132. It should be understood that each node also includes an antenna and controller however these features are not shown in FIG. 1 in order to more clearly demonstrate the present embodiments. The antenna 130 is a phased array antenna in accordance with one embodiment. The controller is configured to control data communication that is sent and received in the peer to peer network and also configured to set a code that corresponds to send and receive slots for the node.

In a mobile network, a node is a set of equipment that moves as a single unit and appears to other nodes as a single sender and receiver within the network. A node is, for example, a hand-held voice radio, a radio relay on an unmanned air vehicle, or a complex set of directional antennas aboard a ship, linked together by computers and a local area network but appearing to other nodes as a single entity. A first node may contain many data sources and destinations, but from a neighboring second node, all those sources and destinations are reached by a single logical link from the neighboring second node to the first node. That is a node appears to other nodes as a single sender and receiver within the network. Some nodes in a mobile network are actually stationary; however, they appear as a unit with zero velocity, and they still appear as a single entity in the network.

Two nodes are neighboring node when the two nodes are able to establish a direct link from one to the other, i.e. they can communicate without a relay. Whether two nodes can be neighbors depends on their transmit power, the size and gain of their antennae, the frequency at which they communicate, their altitude above the ground, and the size and location of barriers.

The TDMA network is, in one example, a peer-to-peer mobile network that utilizes Phased Array Antennas (PAA) for direct communication between nodes in the network. The plurality of nodes transmit and receive data on the same frequency band. In order to enable all nodes in a TDMA phased-array network to efficiently transmit and receive in a single frequency band, time slots for receiving and transmitting between nodes are utilized depending upon the time slots for sending and receiving of surrounding nodes.

One embodiment is intended for use in a high-bandwidth mobile network, for example, a mobile military network. The data rate along a single node-to-node backbone link (for example, from the first node 100 to the second node 102) in the mobile network is around 100 Mbps, and from a backbone node to a terminal node will be around 50 Mbps, in accordance with one embodiment. Direct links between nodes are as long as 450 km. To attain the high data rates at long ranges, directional antennas are used (for example, phased array antennas). Phased Array Antennas (PAAs) developed by BOEING have advantages as compared to other PAAs, including the ability to hop the beam from target to target as rapidly as 10,000 times per second. Hopping the beam permits many links per antenna, but requires that each link use a TDMA protocol.

One prior approach to forming a network of TDMA links using several frequency bands was described in U.S. patent application Ser. No. 10/091,672, filed Mar. 3, 2002, entitled TDMA BACKBONE FOR A MOBILE NETWORK (the '672 application) which is incorporated herein in its entirety. However, the solution described in the '672 application may be unsuitable in cases where there is a need for a low probability of detection (LPD), low probability of interception (LPI), and good anti-jam (AJ) characteristics. To achieve the best possible LPD/LPI/AJ performance, it is appropriate for each link in the TDMA network to use the widest possible RF bandwidth and use spread-spectrum codes to spread the signal over the whole band. For example, if the mobile network is allocated 300 MHz, then every link would use all or most of the 300 MHz for data transmission. This leads to the need for a single frequency TDMA network. Any network where nodes transmit and receive data on the same frequency band can utilize the methods and principles described herein.

When each node utilizes the whole band for transmitting and receiving, then the nodes cannot receive and transmit data at the same instant because if a node tries to receive data while the node is transmitting on the same band, the transmitted signal will interfere (swamp) any incoming signal. Thus, there is a need for determining the TDMA slots each of the plurality of nodes in the TDMA network uses for transmitting and uses for receiving. If two neighboring nodes use the same set of slots for receiving, then those two nodes cannot communicate directly. For example, if the first node 100 and the second node 102 both had the same allocated time slots for receiving, the first node 100 will not be able to communicate with the second node 102. To avoid this problem, some multi-node TDMA networks in prior systems use a central controller to assign TDMA slots in which each node can transmit. (Some cell phone systems work this way, for example.) However, this creates a single point of failure for an enemy to attack or for bad luck to disable. Additionally, the prior system has limited network throughput to the capacity of one transmitter at a time. The prior system also does not have the robustness of a peer-to-peer network and does not exploit the ability of PAA-based networks to transmit data along many spatially-separated beams at the same time.

One embodiment assigns TDMA slots to nodes in a single frequency band mobile peer-to-peer network, where the narrow beams of PAAs are utilized to improve network efficiency. Different methods to assign TDMA slots for nodes in the mobile network are described herein. The different methods have different advantages and limitations, therefore, different methods are used for different applications.

Approach One: In some systems, traffic rates are required to be the same among all pairs of neighboring nodes. For example, in some military networks nodes generate dummy traffic to fill up unused capacity so all links are equally loaded all the time. This prevents an enemy from using traffic analysis to identify high-value nodes. In such a system, each node should transmit in exactly half of the time slots. The transmit slots are chosen so that, for each neighboring node, at least half of a node's transmit slots correspond with receive slots of the neighboring nodes. For example, for the first node 100, at least half of the receive slots of the first node 100 correspond to half of the transmit slots of all of the other nodes that the first node communicates with. Likewise, at least half of the first node's transmit slots correspond with receive slots at all of the other nodes. This way, each node has an equal opportunity to transmit to or receive from every node in its group of neighbors. That is, the first node can transmit to any of the other nodes one fourth of the time and can receive from any of the other nodes one fourth of the time.

To satisfy these requirements, the following method is used to assign time slots for the nodes. There are m time slots in each TDMA frame, where $m=2^k$ and k is an integer. Each node may form radio links with up to $4k-3$ neighbors. For example, if k=3, then $m=2^3=8$ time slots per frame, and each node may link directly to $(4\times3)-3=9$ neighboring nodes.

The allocation of transmit and receive slots for a given node can be expressed as a set of 1's (for transmit slots) and 0's (for receive slots) in a binary code with m bits. The binary code for the slot allocation in node for the first node is denoted by the symbol $S_1$. The allocation of transmit and receive slots follows two rules:

1. For any of the nodes, the slot allocation is 50% transmit slots and 50% receive slots. That is, $S_1$ has exactly 50% 1's.

2. For any pairing of the first node with one of its $4k-3$ neighbors, for example the second node, the bitwise exclusive-or (XOR) of $S_1$ and $S_2$ gives at least 50% 1's. That is, the slot allocations of the two nodes differ in at least half of the slots.

To satisfy these rules, the invention uses codes defined by square waves with periods of $2^k, 2^{k-1} \ldots 2^1$. Other patterns than square waves are possible. The rule is to choose a set of even functions (i.e. 50% 1's) that are mutually orthogonal or inverse to each other. Waves of each period are shifted by a phase angle of zero, ¼, ½, and ¾ of a period, except waves of period 2 which can only be shifted ½ of a period (i.e. shift one slot). Using k=3 as an example, the codes have periods of $2^3$, $2^2$, and $2^1$, with codes of period $2^3$ and $2^2$ shifted to four different phases and the code of period $2^1$ shifted to only two phases. The codes for this example are:

11110000=$S_1$ (period 8, shift 0)
00111100=$S_2$ (period 8, shift ¼ period)
00001111=$S_3$ (period 8, shift ½ period)
11000011=$S_4$ (period 8, shift ¾ period)
11001100=$S_5$ (period 4, shift 0)
01100110=$S_6$ (period 4, shift ¼ period)
00110011=$S_7$ (period 4, shift ½ period)
10011001=$S_8$ (period 4, shift ¾ period)
10101010=$S_9$ (period 2, shift 0)
01010101=$S_{10}$ (period 2, shift ½ period)

There are 4k−2=10 codes in this set. Most pairs of codes in this set have 50% overlap. For example, $S_1$ XOR $S_5$=00111100. These pairs can communicate 50% of the time, 25% in each direction.

Pairs that are inverses of each other have zero overlap. For example, $S_1$ XOR $S_2$=11111111. These pairs are able to communicate 100% of the time, 50% in each direction. However, nodes in these pairs may or may not choose to use all those opportunities to communicate, depending on whether the network has a requirement for equal traffic on all links between pairs.

When a node joins the network, the node picks a code from the allowable set. In one embodiment, nodes change codes as they get different neighbors. One embodiment of the process for joining the network and acquiring a code is described below with reference to FIG. 2. The particular code the joining node selects is any code that is not used by its 4k−3 nearest visible neighbors. As described herein, 'visible' means directly reachable at whatever RF frequency the communication system uses. Since there are 4k−2 codes, there will always be at least one code unused among the 4k−3 nearest neighbors, and the joining node is guaranteed to be able to link directly to each of those 4k−3 neighbors. The joining node may also be able to link to additional nodes that are within range and whose codes differ from its own, provided this does not violate other requirements for the network. For example, for nodes that do not use directional antennas (for example, a PAA), linking to a more distant node requires each node to transmit with so much power that it may interfere with links among other pairs of nodes and thus, not be acceptable. As another example, in a military network, linking to a more distant node requires each node to transmit with more power, which may make the nodes easier for the enemy to detect.

In one embodiment, one of the requirements for the system is that each node be able to link directly to as many as N neighboring nodes, we must choose k such that (4k−3)≧N. This puts a lower bound on the length, m, of a TDMA frame, because m=$2^k$. If the duration of each TDMA slot is short enough, this scheme may work adequately for values of k as high as 10, which means m=$2^k$=1024 slots per frame. For longer slots, we may want to limit values of k to about 5, so m=$2^k$=32 slots per frame. The constraint is packet latency. If a node only gets to transmit, for example, in the last half of a TDMA cycle (node $S_3$), then a 1024-slot TDMA frame means the node must wait 512 slots to transmit. If a slot lasts 100 μsec, latency from that node may be 51 milliseconds which is long but acceptable. If a slot lasts 5 milliseconds, then latency from that node could be 2.5 seconds, which is unlikely to be acceptable.

Approach Two: One advantage of approach two compared to approach one is that each node can communicate directly with a larger number of neighbors. To enable greater connectivity, approach two sacrifices some of the symmetry and uniformity of slot allocations provided by approach one.

In this variation, each node allocates roughly half its TDMA slots to transmit and half to receive, but the allocation need not be exactly 50% for each. Further, a first node must potentially be able to transmit to each neighboring node in at least one of the first node's transmit slots and receive from each node in at least one of the first node's receive slots. This is a much less strict approach as compared to the requirement in approach one where each pair of nodes must be able to communicate between each other at least half the time.

The looser constraints and more diverse set of codes can be used to define TDMA slot allocations. The number of bits in the code, m (which is the same as the TDMA frame length), need not be a power of two. The embodiment uses codes defined by square waves with periods of m, m−1, m−2 . . . 2. Waves of each period, P, are shifted by phase angles of zero, 1, 2 . . . up to P−1. Using m=16 as an example:

1010101010101010=$S_1$ (period 2, phase 0)
0101010101010101=$S_2$ (period 2, phase 1)
0010110010110010=$S_3$ (period 3, phase 0)
1001011001011001=$S_4$ (period 3, phase 1)
1100101100101100=$S_5$ (period 3, phase 2)
1100110011001100=$S_6$ (period 4, phase 0)
0110011001100110=$S_7$ (period 4, phase 1)
0011001100110011=$S_8$ (period 4, phase 2)
1001100110011001=$S_9$ (period 4, phase 3)

. . .

1111111000000001=$S_n$ (period 16, phase 15)

$S_3$ actually has a period 6, however $S_3$ is not a period 6 square wave. $S_3$ functions like period 3 square wave with an alternating number of 1's and 0's in succeeding periods: one 1 in odd periods and two 1's in even periods. Also, note that the $S_3$ code has seven 1's and nine 0's. This meets the rule that each code must have approximately 50% each, but not necessarily exactly 50%.

Code pairs with different periods (e.g., period 2 and period 3) are able to communicate in roughly half the TDMA slots. Code pairs with identical periods but different phases (e.g. period 16, phase 0 and period 16, phase 1) might be constrained to communicate in as few as two TDMA slots. To avoid such a few number of TDMA slots that are used to communicate, in one embodiment, phase shifts smaller than ¼ of the period are excluded when the network requires that any pair of nodes be able to communicate in a larger fraction of the TDMA slots.

For a TDMA frame size of m slots, the number of codes is slightly greater than $m^2/2$. For example, m=20 slots per frame gives roughly 200 codes. In that case, a node could communicate directly with up to 200 of its nearest neighbors. Even if ¾ of the codes are eliminated to make remove the codes with a minimal amount of overlap, the system still permits a node to talk directly to 50 of its neighbors when m=16. This method of determining transmission slots for nodes is sufficient for most networks and allows for a large increase in the number of neighbors a node can talk to as compared to the first approach. As with approach one, the node acquires a code upon joining the network. One method of acquiring a code is described below with reference to FIG. 2.

Approach Three: One advantage of approach three is that there is no requirement for a node to learn about its neighbor's transmit and receive times before choosing a slot allocation. Additionally, each node is capable of forming a link directly with every other node, not just a local set of neighbors. In this approach, every node gets a permanent unique digital ID. In one embodiment, the number of bits in the ID is half the number of slots, m, in a TDMA frame. In an alternative embodiment, the number of bits in the ID is less that half the number of slots in the TDMA frame. This provides for some transmit slots that are always open and can be utilized for special signaling, for example, joining the network or establishing a connection with a node. The bits of the ID define one half of the node's TDMA allocation (for example, the 1's denote the receive slots and the 0's denote the send slots). The first half of the ID is a completely random bit string with the constraint that the same bit string is not assigned to two nodes. The second half of the ID is the bitwise inverse of the first half. This ensures that half of all slots are used to transmit and half are used to receive. An example for m=16, where m=the number of slots per TDMA frame:

IDA=10110101 (first 8 bits)
Inverse of A=01001010 (second 8 bits)
Slot code=1011010101001010 (16 bits, 50% of them 1's)
ID B=10110110 (first 8 bits)
Inverse of B=01001001 (second 8 bits)
slot code=1011011001001001 (underlined slots differ from A)

Any two nodes in the system differ in at least one ID bit and therefore in at least two TDMA slots: one for transmission from the first node to the second node and one for transmission from the second node to the first node. Statistically, most pairs would differ in about half of their slots.

In this approach, no negotiation or query is needed when joining the network because the TDMA allocation is already set. A 16-bit ID scheme with roughly 65,000 unique codes is used for a large military network in one embodiment. A 32-bit ID scheme is used for almost any very large network.

Each node of the TDMA network receives the ID in any number of ways. For example, in one embodiment, each node receives the ID during manufacturing. In another embodiment, the ID is assigned to a node when it is delivered to the operator of a network. Assignment during manufacture will typically have an ID counter at the factory, where the ID is incremented as each node controller is produced. The new ID is encoded into a Read-Only Memory in the controller. Alternatively, node controllers are produced without an assigned ID. When they are delivered to the owner of a network, the owner assigns an ID that is unique within the network. This locally unique ID is written into some non-volatile medium within the node controller, e.g. a flash EPROM.

In one embodiment a network is created where data is sent and received over the same frequency band, however, there are multiple frequency bands within the network. For example, one network includes three frequency bands for transmitting data. A first frequency band utilizes the first approach described herein. The second frequency band utilizes the second approach described herein and the third frequency band utilizes the third approach described here. This allows for more sensitive data to be sent over the first frequency band where there is much less chance of successful traffic analysis due to the symmetry of transmit and receive slots, however also provides for nodes to talk to many other nodes (for example, over the second band) or any of the other nodes (for example, over the third band). Other combinations or variations of a multi-band network are also contemplated.

Figure 2:
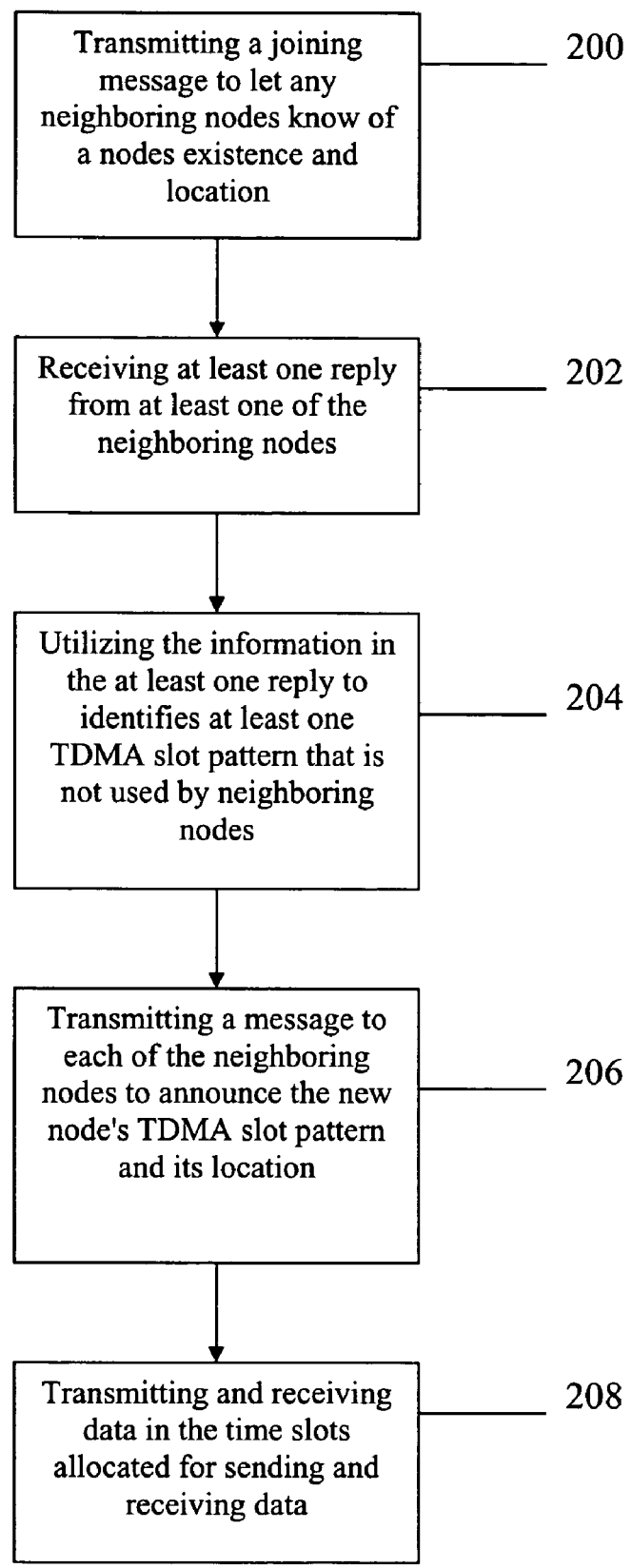
FIG. 2 is a flow diagram illustrating a method of determining send and receive slots for a node in the TDMA network of FIG. 1.

Referring to FIG. 2 a flow diagram is shown illustrating a method of determining send and receive slots for a node in the TDMA network of FIG. 1.

In step 200, the new node transmits a joining message to let any neighbors know of the new node's existence and location. (The location part may be encoded in the message, e.g. as GPS coordinates; or the other nodes may infer the new node's location by the strength and direction of the signal reaching them.) In one embodiment, the message is sent out of band (i.e. in a reserved frequency band that's outside of the band where network traffic occurs). In another embodiment, this message is sent in a TDMA slot that's reserved for joining the network and therefore is never used for regular network traffic. In a third preferred embodiment, the message is sent in a frequency band where the network uses pre-assigned TDMA slots for every node. A network utilizing pre-assigned TDMA slots for every node is described above with reference to FIG. 1.

At least one other node replies with a message that declares its own TDMA slot pattern and its location. In one preferred embodiment, the replying node includes in its reply the locations and TDMA slot patterns of all other nodes that the replaying node knows of. In step 202, the new node receives the at least one reply. From the reply or replies, it identifies its (4k−3) nearest neighbors (if using Approach One) or its ($m^2/2$) nearest neighbors (if using Approach Two). There are at least three ways for the new node to identify its nearest neighbors from the replies it receives: signal strength (weaker=farther), delay time of the reply (more delay=farther), or encoded location data such as GPS coordinates.

In step 204, using the TDMA slot patterns listed in the at least one reply, the new node identifies at least one TDMA slot pattern that is not used by the set of nearest neighbors. The node then selects one of the at least one TDMA slot patterns that is not being used. This slot pattern is used by the node for identifying transmit and receive slots.

In step 206, in one or more of the transmit slots of the selected TDMA slot pattern, the new node transmits a message to each of its nearest neighbors. The message announces the new node's TDMA slot pattern and its location (which may have changed slightly since its initial joining message).

In step 208, the new node and its nearest neighbors begin exchanging network traffic in the agreed-upon slots.

In one embodiment, after joining the network, each node periodically sends a joining message. This allows nodes belonging to one mobile network to discover and join other mobile networks that operate in the same region. This is important, for example, when a Navy fleet with a mobile network among its ships sails into a region where the Air Force operates a mobile network among its aircraft. Nodes that receive a joining message check to see whether the message comes from a node they already know about, i.e. a node that already belongs to the network. If the node does belong to the network the other nodes don't respond; if the node doesn't belong to the network, the other nodes respond as described above with reference to step 202.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

I claim:

1. A method of acquiring transmit and receive slots in a peer-to-peer network comprising: acquiring data about a plurality of nodes in the network, the data including a code corresponding to send slots and receive slots for the plurality of nodes; finding an available code based upon the data about the plurality of nodes in the network; and setting send slots and receive slots based upon the available code, wherein each code in the set of codes includes half receive slots and half send slots.

2. The method of claim 1 further comprising sending the available code to at least one of the plurality of nodes in the network.

3. The method of claim 1 further comprising sending a joining message to at least one of the plurality of nodes.

4. The method of claim 1 wherein the available code is one of a set of codes, the set of codes defined by a set of even functions that are mutually orthogonal to each other.

5. The method of claim 1 wherein the available code is one of a set of codes, the set of codes defined by a set of even functions that are inverse to each other.

6. The method of claim 1 wherein the set of codes is defined by a square waves having periods of: $2^k, 2^{k-1} \ldots 2^1$, wherein k is an integer.

7. The method of claim 6 wherein k is chosen such that $(4k-3) \geq N$, where N is a minimum number of neighboring nodes.

8. The method of claim 1 wherein the set of codes is defined by a function having periods of m, m−1, m−2 . . . 2, wherein m is an integer.

9. The method of claim 8 wherein m is the number of bits in a frame.

10. The method of claim 8 wherein m is smaller than the number of bits in a frame.

11. The method of claim 1 wherein the plurality of nodes send and receive data using the same frequency band.

12. A node in a peer-to-peer communication network comprising: an antenna for sending and receiving data; and a controller configured to acquire information about neighboring nodes within the peer-to-peer network and configured to set a code corresponding to send and receive slots based upon the information acquired about the neighboring nodes, wherein each code in a set of codes includes half receive slots and half send slots.

13. The node of claim 12 wherein the node sends data and receives data over the same frequency band.

14. The node of claim 12 wherein the code is one of a set of codes, the set of codes defined by a set of even functions that are mutually orthogonal to each other.

15. The node of claim 12 wherein the code is one of a set of codes, the set of codes defined by a set of even functions that are inverse to each other.

16. The node of claim 12 wherein a set of codes is defined by square waves having periods of: $2^k, 2^{k-1} \ldots 2^1$, wherein k is an integer.

17. The node of claim 16 wherein k is chosen such that $(4k-3) \geq N$, where N is a minimum number of neighboring nodes.

18. The node of claim 12 wherein the set of codes is defined by functions having periods of m, m−1, m−2 . . . 2, wherein m is an integer.

19. The node of claim 18 wherein m is the number of slots in a frame.

20. The node of claim 18 wherein m is smaller than the number of slots in a frame.

21. The node of claim 12 wherein the antenna is a directional antenna.

22. The node of claim 21 wherein the antenna is a phased array antenna.

23. A method of acquiring transmit and receive slots in a peer-to-peer network comprising: acquiring data about a plurality of nodes in the network, the data including a code corresponding to send slots and receive slots for the plurality of nodes; finding an available code based upon the data about the plurality of nodes in the network; and setting send slots and receive slots based upon the available code, wherein the set of codes is defined by a square waves having periods of: $2^k, 2^{k-1} \ldots 2^1$, wherein k is an integer.

24. The method of claim 23 further comprising sending the available code to at least one of the plurality of nodes in the network.

25. The method of claim 23 further comprising sending a joining message to at least one of the plurality of nodes.

26. The method of claim 23 wherein the available code is one of a set of codes, the set of codes defined by a set of even functions that are mutually orthogonal to each other.

27. The method of claim 23 wherein the available code is one of a set of codes, the set of codes defined by a set of even functions that are inverse to each other.

28. The method of claim 23 wherein each code in the set of codes includes half receive slots and half send slots.

29. The method of claim 23 wherein k is chosen such that $(4k-3) \geq N$, where N is a minimum number of neighboring nodes.

30. The method of claim 23 wherein the set of codes is defined by a function having periods of m, m−1, m−2 . . . 2, wherein m is an integer.

31. The method of claim 30 wherein m is the number of bits in a frame.

32. The method of claim 30 wherein m is smaller than the number of bits in a frame.

33. The method of claim 23 wherein the plurality of nodes send and receive data using the same frequency band.

34. A method of acquiring transmit and receive slots in a peer-to-peer network comprising: acquiring data about a plurality of nodes in the network, the data including a code corresponding to send slots and receive slots for the plurality of nodes; finding an available code based upon the data about the plurality of nodes in the network; and setting send slots and receive slots based upon the, available code, wherein the set of codes is defined by a function having periods of m, m−1, m−2 . . . 2, wherein m is an integer.

35. The method of claim 34 further comprising sending the available code to at least one of the plurality of nodes in the network.

36. The method of claim 34 further comprising sending a joining message to at least one of the plurality of nodes.

37. The method of claim 34 wherein the available code is one of a set of codes, the set of codes defined by a set of even functions that are mutually orthogonal to each other.

38. The method of claim 34 wherein the available code is one of a set of codes, the set of codes defined by a set of even functions that are inverse to each other.

39. The method of claim 34 wherein each code in the set of codes includes half receive slots and half send slots.

40. The method of claim 34 wherein the set of codes is defined by a square waves having periods of: $2^k, 2^{k-1} \ldots 2^1$, wherein k is an integer.

41. The method of claim 40 wherein k is chosen such that $(4k-3) \geq N$, where N is a minimum number of neighboring nodes.

42. The method of claim 34 wherein m is the number of bits in a frame.

43. The method of claim 34 wherein m is smaller than the number of bits in a frame.

44. The method of claim 34 wherein the plurality of nodes send and receive data using the same frequency band.

45. A node in a peer-to-peer communication network comprising: an antenna for sending and receiving data; and a controller configured to acquire information about neighboring nodes within the peer-to-peer network and configured to set a code corresponding to send and receive slots based upon the information acquired about the neighboring nodes, wherein a set of codes is defined by square waves having periods of: $2^k, 2^{k-1} \ldots 2^1$, wherein k is an integer.

46. The node of claim 45 wherein the node sends data and receives data over the same frequency band.

47. The node of claim 45 wherein the code is one of a set of codes, the set of codes defined by a set of even functions that are mutually orthogonal to each other.

48. The node of claim 45 wherein the code is one of a set of codes, the set of codes defined by a set of even functions that are inverse to each other.

49. The node of claim 45 wherein each code in a set of codes includes half receive slots and half send slots.

50. The node of claim 45 wherein k is chosen such that $(4k-3) \geq N$, where N is a minimum number of neighboring nodes.

51. The node of claim 45 wherein the set of codes is defined by functions having periods of m, m−1, m−2 . . . 2, wherein m is an integer.

52. The node of claim 51 wherein m is the number of slots in a frame.

53. The node of claim 51 wherein m is smaller than the number of slots in a frame.

54. The node of claim 45 wherein the antenna is a directional antenna.

55. The node of claim 54 wherein the antenna is a phased array antenna.

56. A node in a peer-to-peer communication network comprising: an antenna for sending and receiving data; and a controller configured to acquire information about neighboring nodes within the peer-to-peer network and configured to set a code corresponding to send and receive slots based upon the information acquired about the neighboring nodes, wherein the set of codes is defined by functions having periods of m, m−1, m−2 . . . 2, wherein, m is an integer.

57. The node of claim 56 wherein the node sends data and receives data over the same frequency band.

58. The node of claim 56 wherein the code is one of a set of codes, the set of codes defined by a set of even functions that are mutually orthogonal to each other.

59. The node of claim 56 wherein the code is one of a set of codes, the set of codes defined by a set of even functions that are inverse to each other.

60. The node of claim 56 wherein each code in a set of codes includes half receive slots and half send slots.

61. The node of claim 56 wherein a set of codes is defined by square waves having periods of: $2^k, 2^{k-1} \ldots 2^1$, wherein k is an integer.

62. The node of claim 61 wherein k is chosen such that $(4k-3) \geq N$, where N is a minimum number of neighboring nodes.

63. The node of claim 56 wherein m is the number of slots in a frame.

64. The node of claim 56 wherein m is smaller than the number of slots in a frame.

65. The node of claim 56 wherein the antenna is a directional antenna.

66. The node of claim 65 wherein the antenna is a phased array antenna.

* * * * *